(12) United States Patent
Haggerty

(10) Patent No.: US 8,292,774 B2
(45) Date of Patent: Oct. 23, 2012

(54) DIFFERENTIAL LOCK ASSEMBLY INCLUDING COUPLER

(75) Inventor: Ian Neal Haggerty, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 569 days.

(21) Appl. No.: 12/616,171

(22) Filed: Nov. 11, 2009

(65) Prior Publication Data

US 2011/0111913 A1    May 12, 2011

(51) Int. Cl.
*F16H 48/30* (2006.01)
*F16H 48/06* (2006.01)
*F16H 48/20* (2006.01)

(52) U.S. Cl. ........ 475/220; 475/150; 475/223; 475/237; 475/250; 74/473.23

(58) Field of Classification Search ............. 475/220, 475/223, 231, 237, 238, 249, 250, 150; 74/473.21, 74/473.23
See application file for complete search history.

(56) References Cited

U.S. PATENT DOCUMENTS

| | | | |
|---|---|---|---|
| 3,871,249 A | 3/1975 | Jeffers | |
| 4,432,431 A * | 2/1984 | Russell | 180/248 |
| 5,322,484 A | 6/1994 | Reuter | |
| 5,451,188 A | 9/1995 | Kraft et al. | |
| 6,183,386 B1 | 2/2001 | Duggan | |
| 6,428,441 B1 | 8/2002 | Hunt | |
| 7,332,688 B2 | 2/2008 | Browne et al. | |
| 7,892,133 B2 * | 2/2011 | Lubben et al. | 475/231 |
| 7,896,771 B2 * | 3/2011 | Bowers | 475/231 |
| 8,152,672 B2 * | 4/2012 | King et al. | 475/84 |

FOREIGN PATENT DOCUMENTS

WO    WO2006032295 A1    3/2006

* cited by examiner

*Primary Examiner* — Tisha Lewis
(74) *Attorney, Agent, or Firm* — Ulmer & Berne LLP

(57) ABSTRACT

A differential assembly includes an axle, a differential, a differential lock assembly, a selector, and a coupler. The differential is coupled with the axle and is configured to facilitate operation of the axle at an axle speed. The differential lock assembly is associated with the differential and is movable between locked and unlocked positions. The selector is movable between lock-initiate and unlock-initiate positions. The coupler is configured to selectively couple the differential lock assembly and the selector. The coupler is configured for operation in deactivated and activated modes. When the coupler is in the deactivated mode, the differential lock assembly and the selector are decoupled from each other. When the coupler is in the activated mode, the differential lock assembly and the selector are coupled together.

20 Claims, 8 Drawing Sheets

DIFFERENTIAL LOCK ASSEMBLY INCLUDING COUPLER

TECHNICAL FIELD

Vehicles are provided which include a differential lock assembly and a coupler. The coupler is configured to selectively couple the differential lock assembly with a selector.

BACKGROUND

Various motor vehicle differentials are known in the art. Differentials in two wheel drive vehicles are used to transfer torque from a driveshaft of a vehicle to a pair of driven axles to operate a pair of driven wheels, for example the left and right rear wheels of the vehicle. The differential permits the two driven axles to rotate at the same speed when the vehicle is traveling straight on a roadway and also permits the two axles to rotate at different speeds as required when the vehicle is turning or when traction is reduced at one of the driven wheels.

In some instances it is desirable to lock the differential to prevent the two axles from rotating at different speeds. For example, if one of the wheels loses traction and spins due to operation on a slippery surface such as ice, snow, sand, mud etc., the opposite wheel will lose torque in proportion to the traction lost by the spinning wheel. Consequently, the wheel opposite the spinning wheel may remain motionless and the vehicle is not propelled. Various devices are known that resolve this problem including differential locks.

One known differential lock is incorporated into a differential assembly. The differential lock includes a collar that is movable between unlocked and locked positions. In the unlocked position, the collar is splined to the differential but is disengaged from the axles so that the two driven axles are free to rotate at different speeds. In the locked position, the collar is splined to one of the axles and a rotatable carrier of the differential, which locks the differential. This prevents the two driven axles from rotating at different speeds during operation of the vehicle.

SUMMARY

In accordance with one embodiment, an axle assembly comprises an axle, a differential, a differential lock assembly, a selector, and a coupler. The differential is coupled with the axle and is configured to facilitate operation of the axle at an axle speed. The differential lock assembly is associated with the differential and comprises a first member. The differential lock assembly is movable between a locked position and an unlocked position. The selector comprises a second member. The selector is movable between a lock-initiate position and an unlock-initiate position. The coupler is configured to movably support the first member and the second member. The coupler is configured for operation in a deactivated mode and an activated mode. When the coupler is in the deactivated mode, the first member and the second member are movable with respect to each other. When the coupler is in the activated mode, the first member and the second member are coupled together.

In accordance with yet another embodiment, an axle assembly comprises an axle, a differential, a differential lock assembly, a selector, and a coupler. The differential is coupled with the axle and is configured to facilitate operation of the axle at an axle speed. The differential lock assembly is associated with the differential and is movable between a locked position and an unlocked position. The selector is movable between a lock-initiate position and an unlock-initiate position. The coupler comprises rheological fluid and an input. The coupler is configured to selectively couple each of the differential lock assembly and the selector. The input is configured to receive an activation signal. Wherein the coupler is configured for operation in a deactivated mode and an activated mode in response to the activation signal. Wherein when the coupler is in the deactivated mode, the differential lock assembly and the selector are decoupled from each other. Wherein when the coupler is in the activated mode, the differential lock assembly and the selector are coupled together such that movement of the selector to the lock-initiate position facilitates movement of the differential lock assembly into the locked position.

In accordance with yet another embodiment, an axle assembly comprises an axle, a differential, a differential lock assembly, a selector, a coupler, and a controller. The differential is coupled with the axle and is configured to facilitate operation of the axle at an axle speed. The differential lock assembly is movable between a locked position and an unlocked position. The differential lock assembly comprises a first member, a lock fork, and a lock collar. The lock fork is attached to the first member. The lock collar is pivotally coupled with the lock fork and is associated with the differential. The selector comprises a second member. The selector is movable between a lock-initiate position and an unlock-initiate position. The coupler comprises rheological fluid and an input. The coupler is configured to movably support the first member and the second member. The controller is coupled with the input of the coupler and is configured to facilitate communication of an activation signal to the input when a vehicular condition is below a threshold value. Wherein, in response to the activation signal from the controller, the rheological fluid is configured to couple the first member and the second member together such that movement of the selector to the lock-initiate position facilitates movement of the differential lock assembly into the locked position.

In accordance with yet another embodiment, a vehicle comprises a frame assembly, an axle, a differential, a differential lock assembly, a selector, and a coupler. The axle is rotatably supported with respect to the frame assembly. The differential is coupled with the axle and is configured to facilitate operation of the axle at an axle speed. The differential lock assembly is associated with the differential and is movable between a locked position and an unlocked position. The selector is movable between a lock-initiate position and an unlock-initiate position. The coupler is configured to rotatably support each of the differential lock assembly and the selector. The coupler is configured for operation in a deactivated mode and an activated mode. Wherein, when the coupler is in the deactivated mode, the differential lock assembly and the selector are configured to rotate with respect to each other. Wherein when the Coupler is in the activated mode, the differential lock assembly and the selector are coupled together such that movement of the selector to the lock-initiate position facilitates movement of the differential lock assembly into the locked position.

BRIEF DESCRIPTION OF THE DRAWINGS

Various embodiments will become better understood with regard to the following description, appended claims and accompanying drawings wherein:

DETAILED DESCRIPTION

Figure 1:
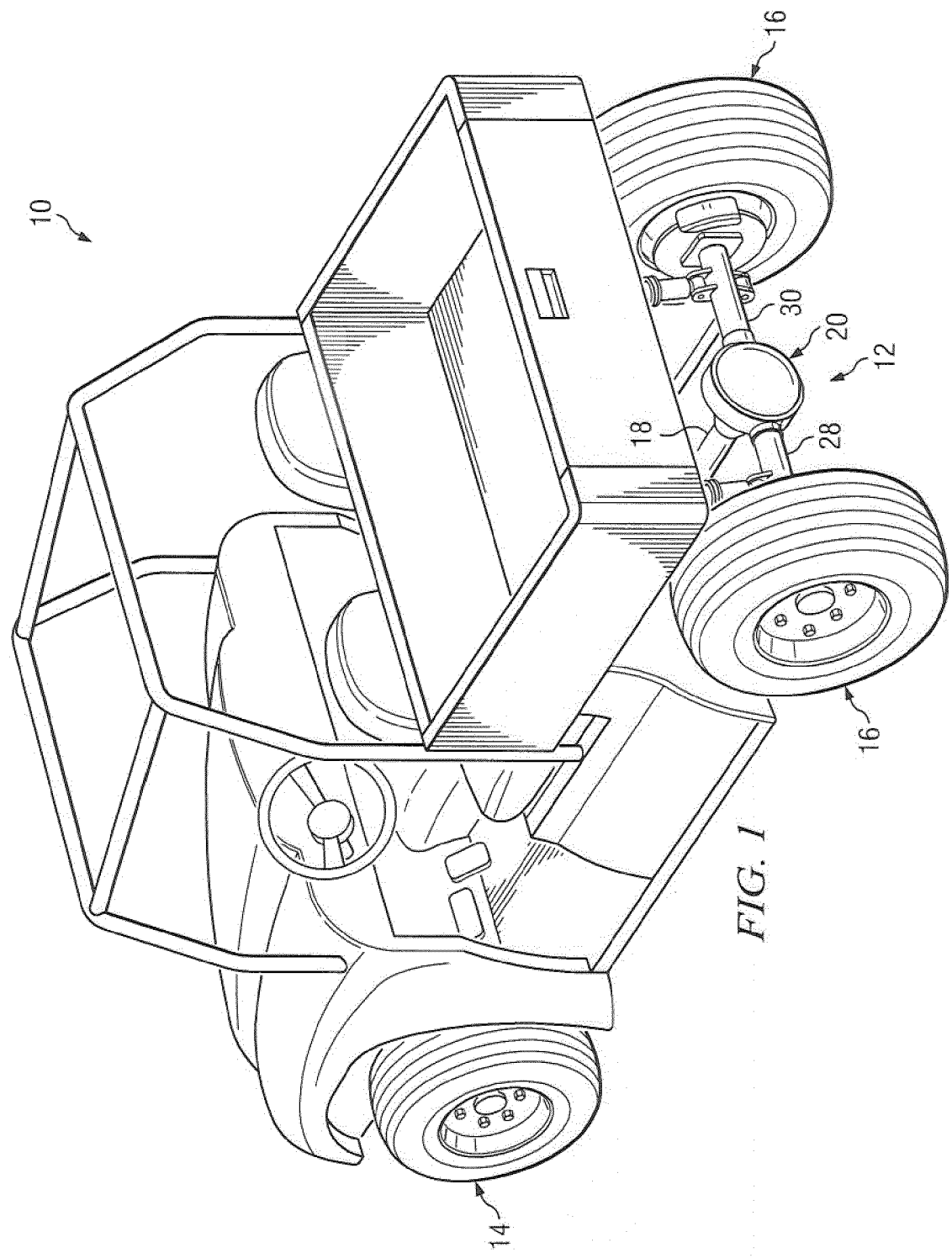
FIG. 1 is a left rear perspective view of a vehicle incorporating an axle assembly.

Referring to the drawings, wherein like reference numbers indicate the same or corresponding elements throughout the views, FIG. 1 illustrates a vehicle 10 that can incorporate an axle assembly 12 according to one embodiment. The axle assembly 12 can be provided on a small utility vehicle, such as vehicle 10 shown in FIG. 1 and can also be used on a variety of other vehicles including all terrain vehicles, golf carts, "dune buggies", automobiles, and trucks.

Vehicle 10 includes two front wheels 14 (one shown) and two rear wheels 16. Vehicle 10 also includes a source of motive power (not shown) and a drivetrain, which can include a driveshaft 18 and the axle assembly 12, for transferring torque from the source of motive power to the rear wheels 16. The source of motive power can be an internal combustion engine, which can use one or more of a variety of fuels, an electric motor or any other suitable source of motive power.

Figure 2:
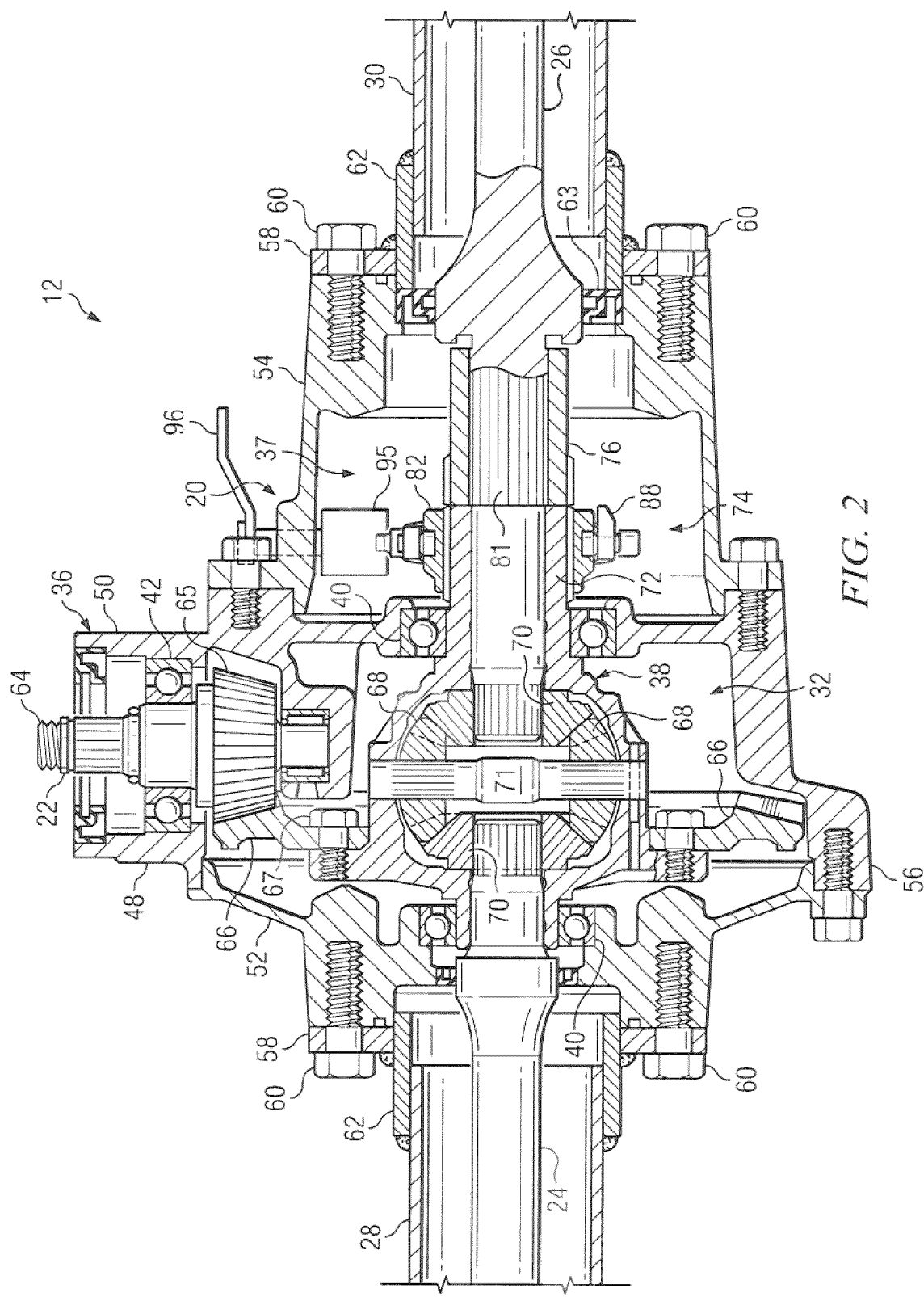
FIG. 2 is a cross-sectional view of the axle assembly of FIG. 1 depicting a differential lock assembly in an unlocked position, according to one embodiment.
Figure 3:
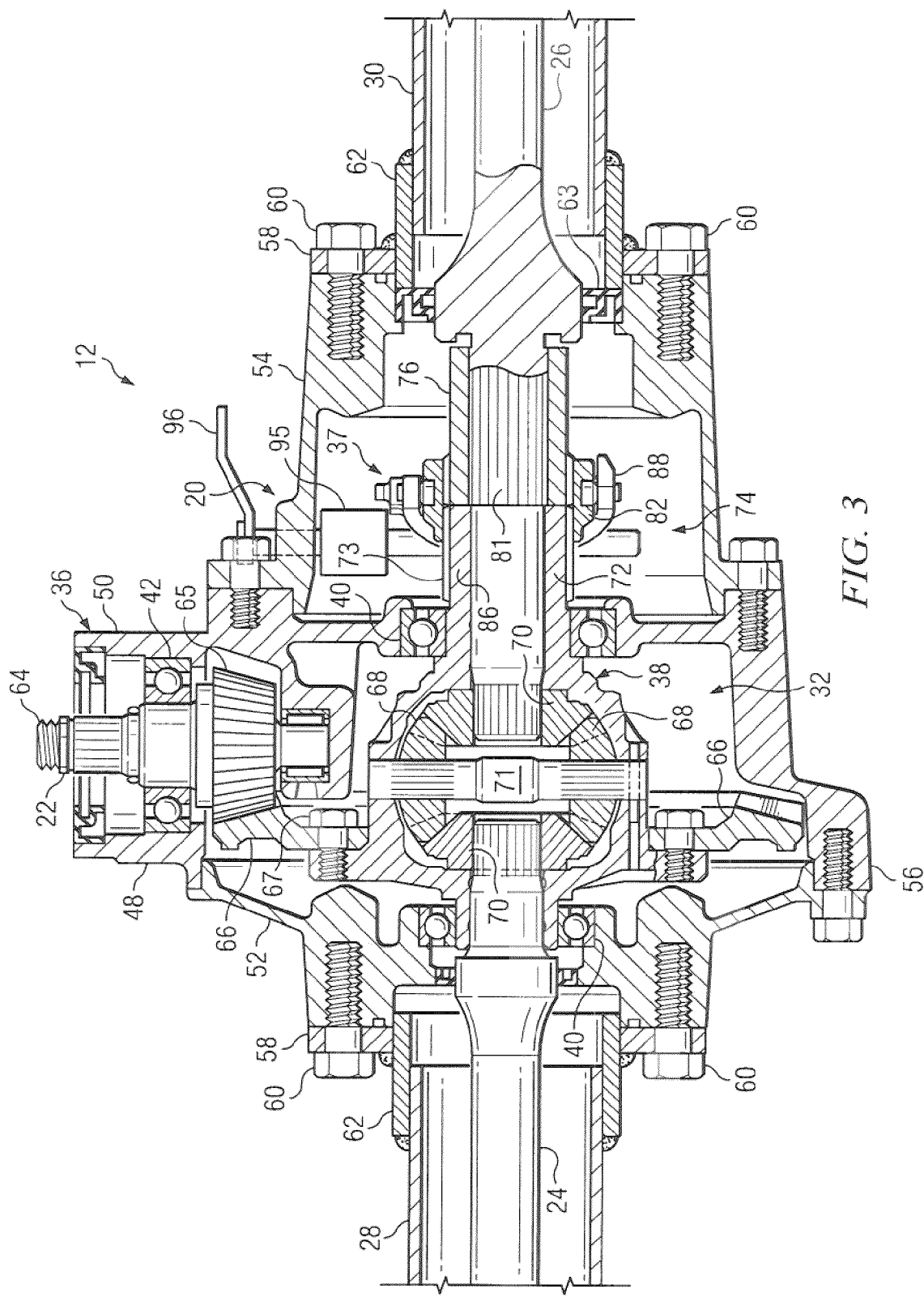
FIG. 3 is a cross-sectional view similar to FIG. 2, but with the differential lock assembly in a locked position.

Referring to FIGS. 1-3, the axle assembly 12 can include a differential assembly 20, an input member 22 that can be coupled to the driveshaft 18, a left axle 24 and a right axle 26. Some components of axle assembly 12 are shown in elevation in FIGS. 2 and 3 for clarity of illustration, and axle assembly 12 is shown schematically in FIG. 1. In one embodiment, left and right axles 24, 26 can be rotatable rear axles. Left axle 24 can be disposed within a stationary axle tube 28 and the right axle 26 can be disposed within a stationary axle tube 30 as shown in FIGS. 2 and 3. Left and right axles 24 and 26 can be rotatably coupled with respective ones of the rear wheels 16, 18 in a manner known in the art. While the differential assembly 20 is shown in FIG. 1 to be associated with rear axles (e.g., 24, 26), in an alternative embodiment, a differential assembly can be associated with front axles to facilitate operation of front wheels, for example.

The differential assembly 20 can include a differential 32 and a housing 36. The differential 32 can be supported within a fluid receptacle 37 that is defined by the housing 36. As is common, differential fluid (e.g., differential oil) can be provided within the fluid receptacle 37 to lubricate the differential 32 during operation. The differential 32 can include a rotatable carrier 38 that can be journalled within the housing 36 by a pair of bearings 40. The rotatable carrier 38 can be rotatably coupled with input member 22 and left and right axles 24, 26 as subsequently described in greater detail. The input member 22 can be journalled within the housing 36 by a bearing 42. During operation of the vehicle 10, the differential 32 transfers torque from the input member 22 to the left axle 24 and the right axle 26.

The housing 36 can include multiple members. For example, the housing 36 can include members 48, 50 that cooperate to define an opening suitable to permit input member 22 to extend through housing 36. The bearing 42 can be positioned between the input member 22 and both of the members 48, 50 of housing 36. The housing 36 can also include a member 52 which journals the left one of bearings 40 and members 54 and 56, which can be connected to one another. Members 50 and 56 can cooperate to journal the right one of bearings 40.

Figure 4:
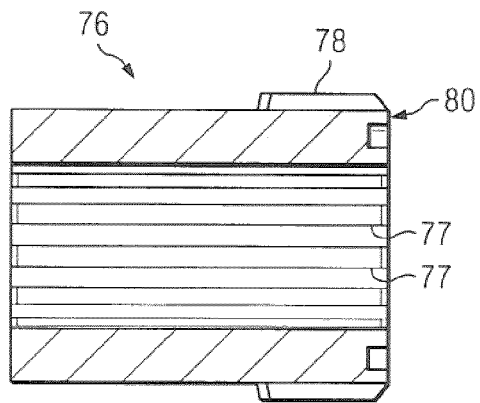
FIG. 4 is an enlarged cross-sectional view of a lock sleeve of the differential assembly of FIGS. 2 and 3.

Differential assembly 20 can include a pair of covers 58. The covers 58 can be fastened to the housing 36 using conventional fasteners such as bolts 60. The differential assembly 20 can also include a pair of sleeves 62, with one of the sleeves 62 co-axially disposed about the axle tube 28 and secured to the axle tube 28, for example by welding. The other sleeve 62 can be co-axially disposed about the axle tube 30 and secured to the axle tube 30, for example by welding. Differential assembly 20 can also include a seal 63 that can be annularly disposed between the right axle 26 and the housing 36 of the differential 32, as shown in FIGS. 2-4. Seal 63 can be effective for retaining, or at least substantially retaining, differential fluid within the fluid receptacle 37.

The input member 22 can be coupled at a first end 64 to the drive shaft 18. The opposite end of the input member 22 can include a pinion gear 65 that meshes with a ring gear 66 that can be secured to the rotatable carrier 38 by conventional fasteners such as a plurality of bolts (e.g., bolts 67). Accordingly, during operation of vehicle 10, rotation of driveshaft 18 can cause the input member 22 to rotate (e.g., at an input speed), which, in turn, can cause rotation of the rotatable carrier 38. The differential assembly 20 can further include a set of differential gears that can include a plurality of spider gears 68 and a pair of side gears 70. The spider gears 68 can be secured to a shaft 71 which is secured to the rotatable carrier 38. Accordingly, the spider gears 68 can be rotatable with the rotatable carrier 38. Each spider gear 68 can mesh with both of the side gears 70.

As shown in FIGS. 2-3, one of the side gears 70 can be secured to an inboard end of the right axle 26, while the other side gear 70 can be secured to an inboard end of the left axle 24. In one embodiment, the side gears 70 can be splined to the respective one of the left and right axles 24, 26. Accordingly, it may be appreciated that rotation of the rotatable carrier 38 can cause the left and right axles 24, 26 to rotate when the differential 32 is unlocked, which in turn can rotate the associated wheels (e.g., rear wheels 16). As known in the art, when the differential 32 is unlocked, spider gears 68 cooperate with the side gears 70 so that the left and right axles 24, 26 can rotate at the same axle speed when the vehicle 10 is traveling straight on a roadway and also cooperate to permit the left and right axles 24, 26 to rotate at different axle speeds as required when the vehicle 10 is turning or when traction is reduced at one of the associated wheels.

The rotatable carrier 38 can include a sleeve 72 that is sized to receive the right axle 26. The sleeve 72 of the rotatable carrier 38 can include a plurality of circumferentially spaced external splines (e.g., 73 shown in FIG. 3).

Axle assembly 12 can further include, a differential lock assembly 74, as illustrated in FIGS. 2, 3, 7, 10 and 11. The differential lock assembly 74 permits the operator of vehicle 10 to selectively lock the differential 32 to prevent the left and the right axles 24, 26 from rotating relative to one another, and accordingly, to prevent the two wheels from rotating relative to one another. This can be desirable in certain instances, for example when one of the rear wheels 16 is spinning due to engagement with a slippery surface such as ice, snow, sand, mud etc.

The differential lock assembly 74 can include a lock sleeve 76. As illustrated in FIG. 4, the lock sleeve 76 can have a plurality of circumferentially spaced internal splines 77 and a plurality of circumferentially spaced external splines 78. The lock sleeve 76 can be co-axially disposed about the right axle 26. In other embodiments (not shown), the differential lock assembly 74 can be associated with the left axle 24. Additionally, it will be appreciated that in other vehicles having a front differential and driven front wheels, the differential lock 74 can be associated with either one of the driven front axles.

Figure 5:
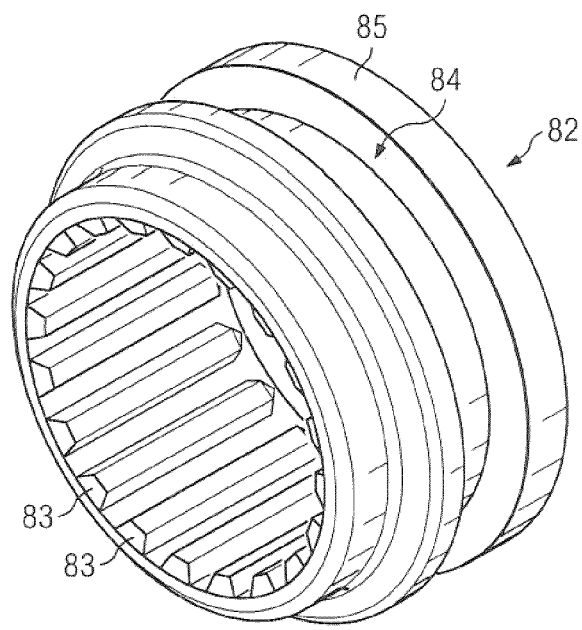
FIG. 5 is an enlarged perspective view of a lock collar of the differential assembly of FIGS. 2 and 3.

The lock sleeve 76 can be splined to the right axle 26, with the internal splines 77 of lock sleeve 76 meshed with external splines 81 of the right axle 26. Accordingly, lock sleeve 76 can be rotatable with the right axle 26. The differential lock assembly 74 can also include a lock collar 82 that is co-axially disposed about the sleeve 72. As illustrated in FIG. 5, the lock collar 82 can include a plurality of circumferentially spaced internal splines 83 and an annular groove 84 defined by an outer surface 85 of the lock collar 82.

Figure 6:
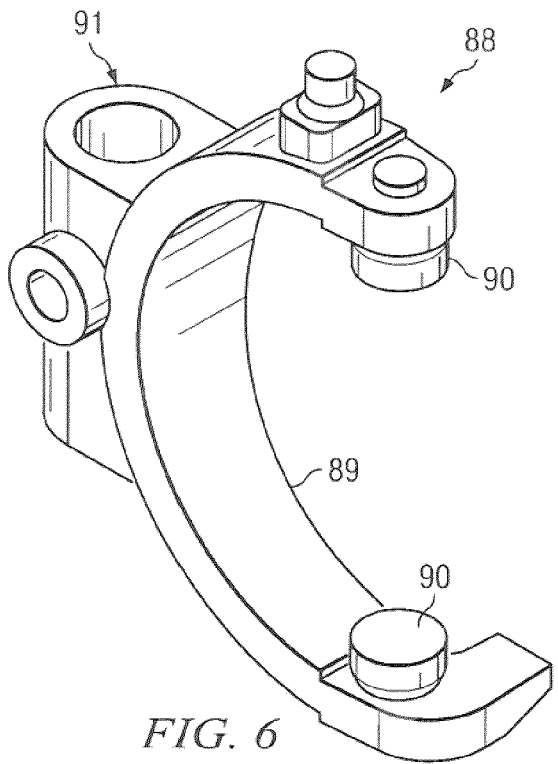
FIG. 6 is an enlarged perspective view of a lock fork of the differential assembly of FIGS. 2 and 3.

The lock collar 82 is laterally movable relative to the lock sleeve 76 of the differential lock assembly 74 and the sleeve 72 of the rotatable carrier 38 between an unlocked position (e.g., as illustrated in FIG. 2) and a locked position (e.g., as illustrated in FIG. 3). Lock collar 82 can be moved between the locked and unlocked positions by a lock fork 88 that engages the lock collar 82. As shown in FIG. 6, the lock fork 88 can include a circumferentially extending member 89 that can extend partially around the lock collar 82. For example, in one embodiment, the circumferentially extending member 89 can encircle about one-half of the circumference of the lock collar 82. The lock fork 88 can further include a plurality of protrusions 90 that extend radially inwardly from the circumferentially extending member 89. The protrusions 90 can be disposed within the annular groove 84 of the lock collar 82. The lock fork 88 can also include an attachment member 91.

When the lock collar 82 is in the unlocked position as shown in FIG. 2, the lock collar 82 is engaged with the sleeve 72 for rotation with the rotatable carrier 38, but is disengaged from the lock sleeve 76. When lock collar 82 is in the unlocked position, the internal splines 83 of lock collar 82 are meshed with the external splines 73 of the sleeve 72. Also, when lock collar 82 is in the unlocked position as shown in FIG. 2, the differential 32 is "unlocked" and the right axle 26 and the left axle 24 are free to rotate relative to the rotatable carrier 38 and are also free to rotate relative to one another.

When the lock collar 82 is in the locked position as shown in FIG. 3, the lock collar 82 can be engaged with both the sleeve 72 of the rotatable carrier 38 and the lock sleeve 76. In this position, the internal splines 83 of lock collar 82 can be meshed with the external splines 73 of the sleeve 72 of the rotatable carrier 38 and can also be meshed with the external splines 78 of lock sleeve 76, which locks the differential 32. Accordingly, when the lock collar 82 is in the locked position shown in FIG. 3, the lock sleeve 76, the rotatable carrier 38 and the right axle 26 can rotate at the same axle speed when the vehicle 10 is in operation. Additionally, when lock collar 82 is in the locked position, the left axle 24 can be prevented, from rotating relative to rotatable carrier 38 and the right axle 26. Consequently, left and right axles 24, 26 and respective associated wheels can rotate at the same speed during operation of vehicle 10, when the lock collar 82 is in the locked position (e.g., the differential 32 is locked).

Figure 7:
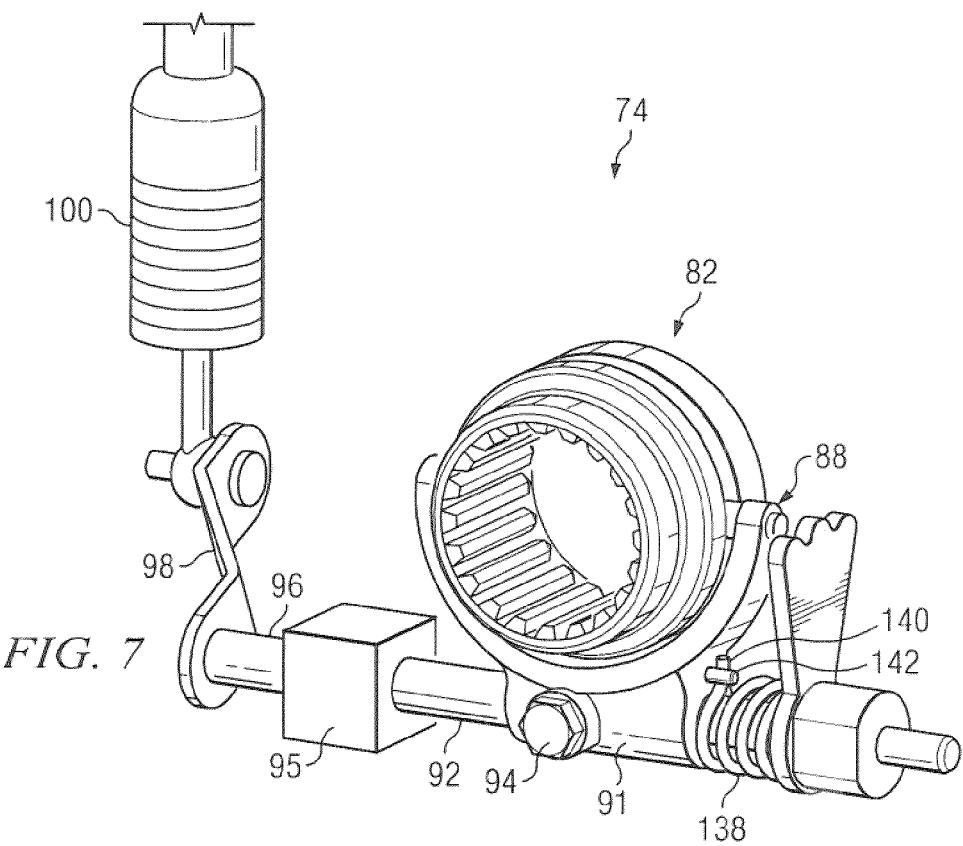
FIG. 7 is an enlarged perspective view of the differential lock assembly of FIGS. 2 and 3 depicting a coupler and a differential lock cable associated with the coupler, according to one embodiment.

As illustrated in FIG. 7, the lock fork 88 can be coupled with a first member 92. The first member 92 can extend through the attachment member 91 and a bolt 94 can selectively secure the lock fork 88 to the first member 92. A second member 96 can be coupled with a shift arm 98. The shift arm 98 can be coupled with a differential lock cable 100. The first member 92 and the second member 96 can each be rotatably supported by a coupler 95.

A selector 102 can facilitate control of the differential lock assembly 74 by an operator of the vehicle 10. In particular, the selector 102 can be actuated by an operator to a lock-initiate position when the operator wants to lock the differential 32 and can be actuated to an unlock-initiate position when the operator wants to unlock the differential 32. In one embodiment, the selector 102 can be mounted within reach of an operator such as along an interior console of a vehicle) such that the operator can manually actuate the selector 102 between the lock-initiate position and the unlock-initiate position.

Figure 8:
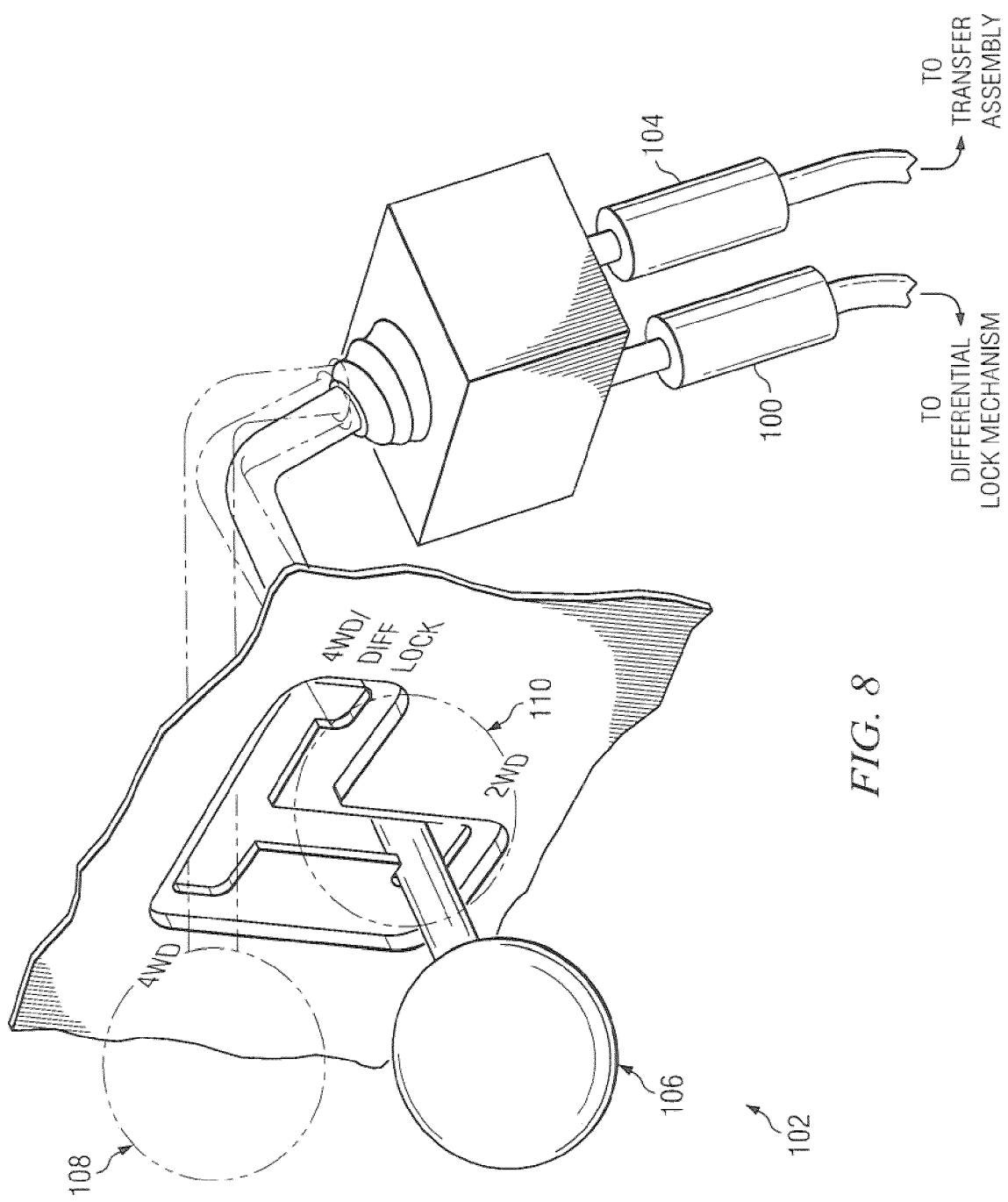
FIG. 8 is a perspective view of a 2WD/4WD lever depicting the 2WD/4WD lever in various positions and coupled with the differential lock cable and a transfer assembly cable.

In one embodiment, and as illustrated in FIG. 8, the selector 102 can comprise a two-wheel drive (2WD)/four-wheel drive (4WD) lever. Selector 102 can be operably coupled with the differential lock cable 100 and a transfer assembly cable 104. Selector 102 can be movable between a 2WD position 106, a 4WD position 108, and a 4WD/differential lock position 110. In such an arrangement, an operator can move selector 102 between the 2WD, 4WD, and 4WD/differential lock positions 106, 108, and 110 to facilitate, 2WD or 4WD operation of the vehicle 10. For example, when selector 102 is moved to the 2WD position 106, the vehicle 10 operates in 2WD (e.g., either the front or rear wheels 14, 16 are driven by the engine). When selector 102 is moved to either the 4WD position 108 or the 4WD/differential lock position 110, the vehicle 10 operates in 4WD (e.g., the front and rear wheels 14, 16 are driven by the engine). It will be appreciated that movement of selector 102 between the 2WD, 4WD and 4WD/differential lock positions, 106, 108, 110 can also facilitate simultaneous control of the differential lock assembly 74. Therefore, in each of the positions 106, 108, 110, the selector 102 can satisfy two conditions. For example, selector 102 can be in an unlock-initiate position when in the 2WD position 106 or the 4WD position 108. Conversely, the 2WD/4WD lever 104 can be in a lock-initiate position when in the 4WD/differential lock position 110.

Figure 9:
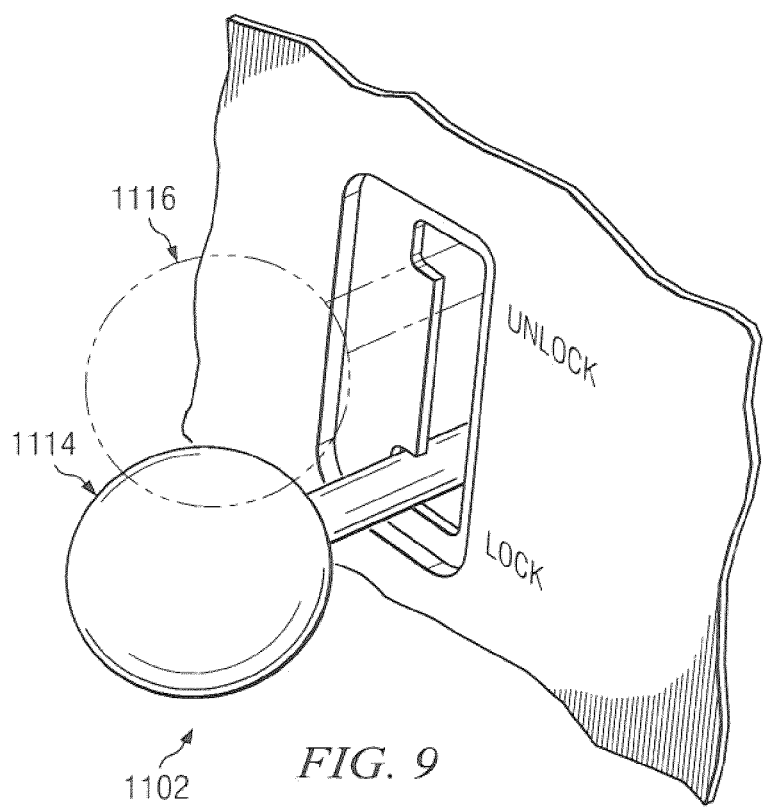
FIG. 9 is a perspective view of a differential lock lever depicting the differential lock lever in various positions.

As illustrated in FIG. 9, in an alternative embodiment, a selector 1102 can include a differential lock lever that is movable between a locked position 1114 (e.g., a lock-initiate position) and an unlocked position 1116 (e.g., an unlock-initiate position). In other embodiments, a selector can be provided that can include one or more of a pushbutton, a rotary switch, or toggle switch, a relay, solid state device, or any of a variety of other suitable devices or components. It will be appreciated that, with respect to a solid state device, a "position" of the selector can comprise a state of the solid state device.

The coupler 95 can be configured to selectively couple the selector 102 with the differential lock assembly 74 such that movement of the selector 102 between the lock-initiate position and the unlock-initiate position can move the shift arm 98 (e.g., to pivot the second member 96). The coupler 95 can be configured for operation in an activated mode and a deactivated mode. When the coupler 95 is in the activated mode, the selector 102 can be coupled with the differential lock assembly 74 such that movement of the selector 102 to the lock-initiate position locks the differential 32. However, when the coupler 95 is in the deactivated mode, the selector 102 and the differential lock assembly 74 are decoupled from one another, and movement of the selector does not operate the differential lock assembly 74.

Figure 10:
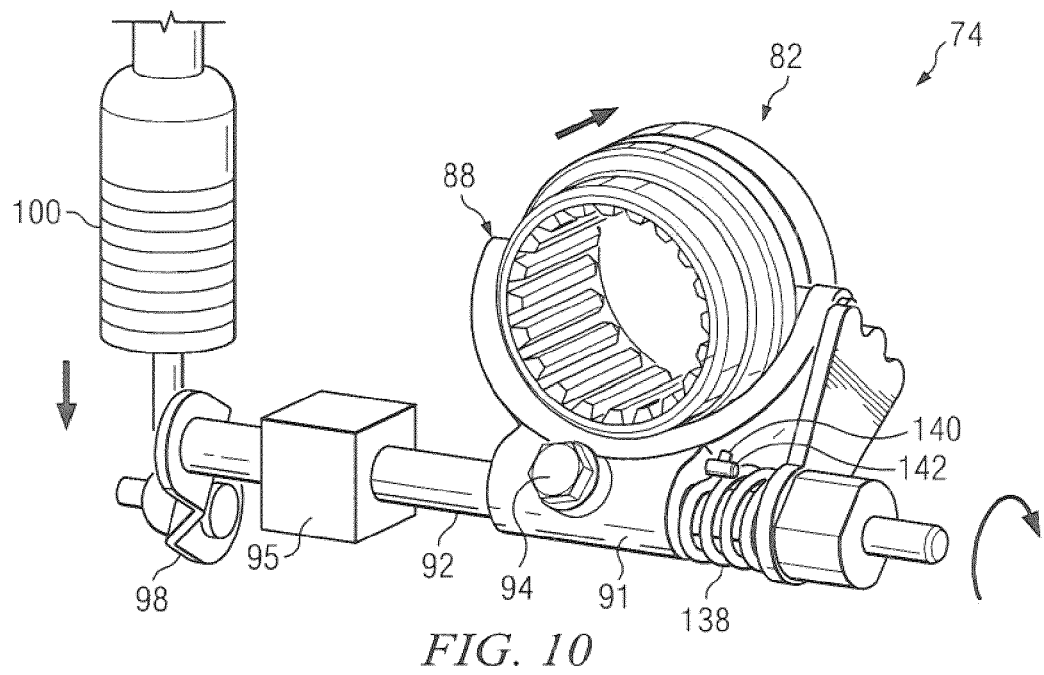
FIG. 10 is an enlarged perspective view of the differential lock assembly of FIG. 7 with the coupler in an activated mode and the shift arm pivoted downwardly.
Figure 11:
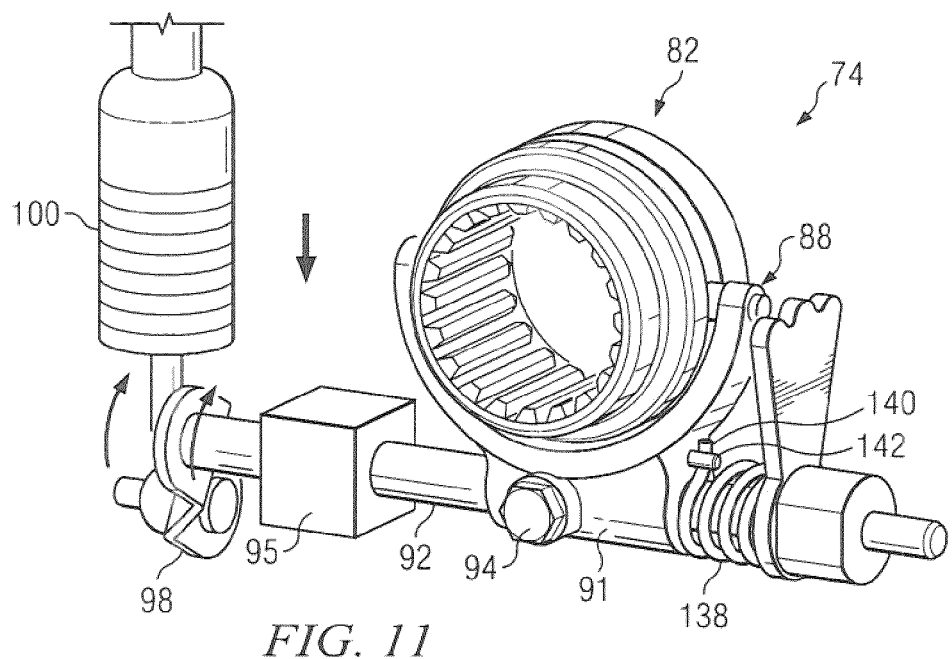
FIG. 11 is an enlarged perspective view of the differential lock assembly of FIG. 7, but with the coupler in a deactivated mode and the shift arm pivoted downwardly.

In one embodiment, the coupler 95 facilitates selective coupling of the first and second members 92, 96 to couple the selector to the differential lock assembly 74. If the coupler 95 is in the activated mode, the first and second members 92, 96 can be coupled together, as illustrated in FIG. 10. When the shift arm 98 is moved downwardly (e.g., through operation of the selector to the lock-initiate position), the lock collar 82 can move to the locked position (as illustrated in FIG. 3). If the coupler 95 is in the deactivated mode, the first and second members 92, 96 can pivot relative to one another, as illustrated in FIG. 11. When the shift arm 98 is moved downwardly, the second member 96 can correspondingly pivot. However, since the first and second members 92, 96 can pivot relative to one another such movement of the shift arm 98 does not move the lock collar 82 (e.g., the lock collar 82 remains in the unlocked position as illustrated in FIG. 2).

Figure 12:
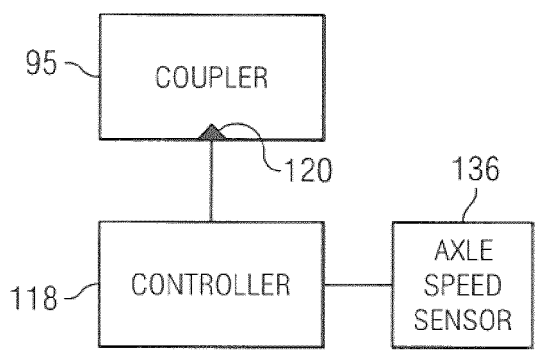
FIG. 12 is a schematic view of the coupler shown in FIGS. 7, 10 and 11 associated with a controller and axle speed sensor.

As illustrated in FIG. 12, a controller 118 can be coupled with the coupler 95 to facilitate control over the operating mode of the coupler 95. In one embodiment, the controller 118 can be coupled with an input 120 of the coupler 95. The controller 118 can be configured to selectively transmit an activation signal to the coupler 95. When the controller 118 transmits the activation signal to the coupler 95, the coupler 95 can be activated (e.g., the coupler 95 operates in the activated mode) such that movement of the selector between the lock-initiate and unlock-initiate positions correspondingly operates the differential lock assembly 74 to respectively lock and unlock the differential 32. However, when the activation signal to the coupler 95 is interrupted, the coupler 95 can be deactivated (e.g., the Coupler 95 operates in the deactivated mode) such that movement of the selector between the lock-initiate and unlock-initiate positions does not operate the differential lock assembly 74 to respectively lock and unlock the differential 32.

Figure 13:
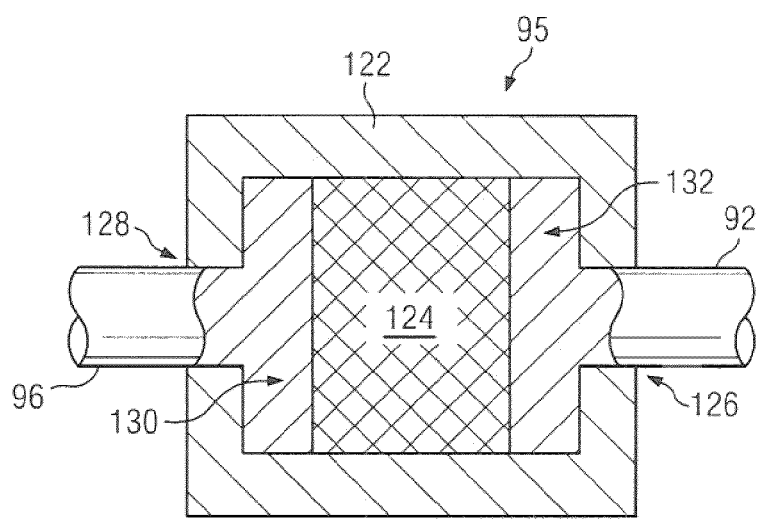
FIG. 13 is a cross-sectional view of the coupler of FIGS. 7, 10 and 11 shown according to one embodiment.

In one embodiment, as illustrated in FIG. 13, the coupler 95 can include a housing 122 that defines a fluid chamber 124 and a pair of openings 126, 128. The first and second members 92, 96 can extend through respective openings 126, 128 such that proximal ends 130, 132 of the first and second members 92, 96 are disposed within the fluid chamber 124. The first and second members 92, 96 can be journalled within the respective openings 126, 128. In such an embodiment, the housing 122 can contain electrorheological fluid and the controller 118 can be configured to selectively transmit electrical current to the input 120. When electrical current is transmitted to the electrorheological fluid (e.g., through the input 120), the viscosity of the electrorheological fluid can increase to thereby couple the first and second members 92, 96 together. However, when the electrical current is interrupted, the viscosity of the electrorheological fluid can decrease to allow the first and second members 92, 96 to pivot with respect to each other such that the differential lock assembly 74 remains unlocked.

Figure 14:
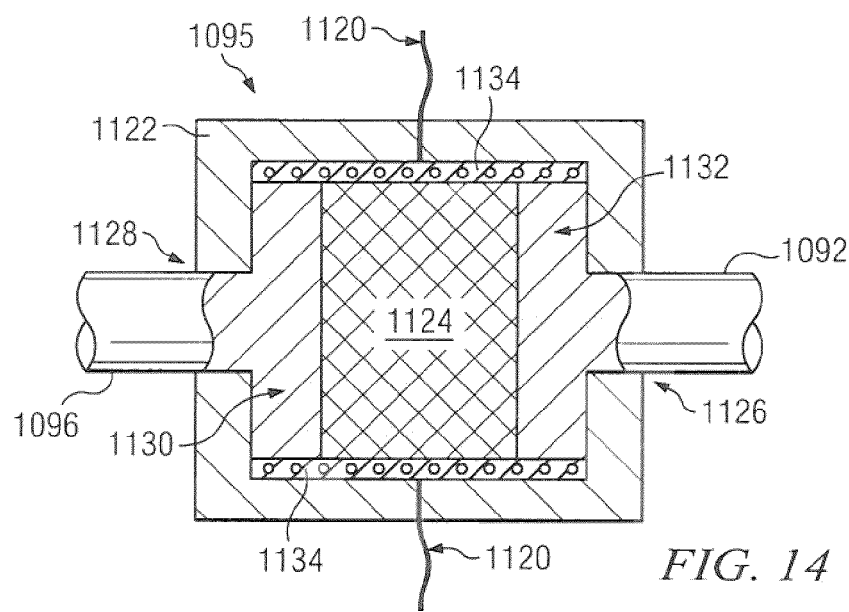
FIG. 14 is a cross-sectional view of the coupler according to another embodiment.

In an alternative embodiment, as illustrated in FIG. 14 a coupler 1095 can be similar to, or the same as, coupler 95 in many respects as shown in comparison to FIG. 13. For example, coupler 1095 can include a housing 1122 that defines a fluid chamber 1124 and a pair of openings 1126, 1128. First and second members 1092, 1096 can be provided into the respective openings 1126, 1128. The housing 1122 however can include magnetorheological fluid. An electromagnetic coil 1134 can be provided along the outer perimeter of the housing and between the housing 1122 and the first and second members 1092, 1096. A controller (e.g., 118) can be coupled with an input (e.g., leads 1120) and can be configured to transmit electrical current to the electromagnetic coil 1134. In response to the electrical current, the electromagnetic coil 1134 can impart a magnetic field to the magnetorheological fluid. In the presence of the magnetic field, viscosity of magnetorheological fluid can increase to thereby couple the first and second members 1092, 1096 together (e.g., to couple the differential lock assembly 74 and the selector together). However, when the magnetic field is removed, the viscosity of the magnetorheological fluid can decrease to allow the first and second members 1092, 1096 to pivot with respect to each other such that the differential lock assembly 74 remains unlocked.

It will also be appreciated that a coupler can additionally or alternatively be provided that configured in any of a variety of suitable alternative arrangements for facilitating selective coupling of a differential lock assembly and a selector together. For example, a coupler can be responsive to other types of activation signals.

It will be appreciated that movement of the lock collar 82 during certain axle speeds can increase the likelihood of damage to the lock collar 82 and/or other components of the differential 32 (e.g., the rotatable carrier 38, the spider gears 68, the side gears 70, the shaft 71). The controller 118 can therefore be configured to control operation of the coupler 95 according to the axle speed of the vehicle 10. The controller 118 can be coupled with a speed sensor 136 (as illustrated in FIG. 12) that is configured to detect the axle speed of the vehicle 10. If the axle speed is less than a threshold value, the controller 118 can activate, the coupler 95 to couple the selector with the differential assembly 74. While the axle speed stays below the threshold speed, operation of the selector can correspondingly operate the differential lock 74. However, once the axle speed increases above the threshold value, the controller 118 can deactivate the coupler 95. For example, when the axles are operating above an axle speed that facilitates a vehicle speed of about 6 M.P.H. (e.g., the threshold speed), movement of the lock collar 82 may harm the differential 32. Therefore, during operation of the vehicle 10, so long as the axle speed remains below the threshold speed, the controller 118 transmits an activation signal to the coupler 95. However, once the axle speed exceeds the threshold value, the controller 118 interrupts the activation signal to the coupler 95 to decouple the selector from the differential lock assembly 74 so that the selector can no longer move the lock collar 82.

It will be appreciated that other vehicular conditions can affect the likelihood of damage to the lock collar 82 and/or other components of the differential 32. Therefore, the coupler 95 can be activated and deactivated according to other vehicular conditions. For example, moving the lock collar 82 when the temperature of the differential fluid is too hot (e.g., exceeds a threshold value of about 200° F.) or too cold (e.g., below a threshold value of about 0° F.) can harm the differential 32. Therefore, in such an arrangement, the coupler 95 can be activated when the differential fluid temperature falls between a particular temperature range. In another example, moving the lock collar 82 may harm the differential 32 when the difference between the speeds of each axle exceeds a threshold speed (e.g., one of the wheels is spinning freely with the other of the wheels stopped). Therefore, in such an embodiment, the coupler 95 can be activated when the difference between the axle speed of the left axle 24 and right axle 26 is less than a predefined range. In another example, moving the lock collar 82 may harm the differential 32 when the vehicular drive train assembly malfunctions (e.g., the vehicle 10 is in a "Limp Home" mode). Therefore, in such an embodiment, the coupler 95 can be deactivated if a vehicular drive train assembly malfunction is detected. It will be appreciated that a controller can be coupled with any of a variety of vehicular condition sensors that facilitate detection of a vehicular condition.

In one embodiment, when the vehicular condition exceeds the threshold value with the locking collar 82 in the locked position, the differential locking assembly 74 can be configured to automatically move the lock collar 82 to the unlocked position. For example, as illustrated in FIG. 7, the differential locking assembly 74 can include a resilient member 138. One end of the resilient member 138 can be attached to the first member 92 and the other end can define an arm 140. The lock fork 88 can include a protrusion 142 that is configured to interface with the arm 140. When the coupler 95 is in the activated mode and the selector is moved to move the locking collar 82 into the locked position, the protrusion 142 moves and places the arm 140 under tension. If the coupler 95 then changes to the deactivated mode (e.g., the axle speed exceeds the threshold speed), the arm 140 of the resilient member 138 can act upon the protrusion 140 to move the lock collar 82 into the unlocked position.

It will be appreciated that a controller can be provided upon a vehicle in any of a variety of suitable locations and configurations. The controller can be a stand alone controller or can alternatively be integrated into a vehicular controller such as an electronic control unit (ECU), for example. It will also be appreciated that the controller can be configured to implement any of a variety of suitable control routines or functionality. For example, the controller can be configured to disable the activation signal when the vehicular condition is below the threshold value with the selector in the locked position.

It will be appreciated that although the coupler 95 is described above as rotatably supporting the first and second members 92, 96, the coupler can be configured to otherwise movably support a differential lock assembly and a selector in any of a variety of alternative suitable manners. For example, a coupler can slidably support a first member of a differential locking assembly and first member of a selector. In such an example, when the coupler is in the deactivated state, the differential locking assembly and the selector are free to slide with respect to each other. However, when the coupler is in the activated state, the differential locking assembly and the selector are coupled together such that the differential locking assembly and the selector slide together.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. An axle assembly comprising:
   an axle;
   a differential coupled with the axle and configured to facilitate operation of the axle at an axle speed;
   a differential lock assembly associated with the differential and comprising a first member, the differential lock assembly being movable between a locked position and an unlocked position;
   a selector comprising a second member, the selector being movable between a lock-initiate position and an unlock-initiate position; and
   a coupler configured to movably support the first member and the second member, the coupler being configured for operation in a deactivated mode and an activated mode;
   wherein, when the coupler is in the deactivated mode, the first member and the second member are movable with respect to each other, and when the coupler is in the activated mode, the first member and the second member are coupled together.

2. The axle assembly of claim 1 wherein the coupler operates in the activated mode when a vehicular condition is below a threshold value.

3. The axle assembly of claim 2 wherein the vehicular condition comprises axle speed.

4. The axle assembly of claim 3 wherein, if the differential lock assembly is in the locked position when the axle speed exceeds the threshold value, then the differential lock assembly is configured to move automatically from the locked position to the unlocked position.

5. The axle assembly of claim 1 wherein the coupler comprises rheological fluid and an input, the coupler is configured to operate in the activated mode in response to an activation signal received at the input, and, when the coupler is operating in the activated mode, the rheological fluid is configured to facilitate coupling of the first member and the second member.

6. The axle assembly of claim 5 wherein the rheological fluid comprises electrorheological fluid and the activation signal comprises an electric field.

7. The axle assembly of claim 5 wherein the rheological fluid comprises magnetorheological fluid and the activation signal comprises a magnetic field.

8. The axle assembly of claim 1 wherein the differential lock assembly comprises a lock fork and a lock collar pivotally attached to the lock fork.

9. The axle assembly of claim 8 wherein the first member is pivotally supported by the coupler and the second member is pivotally supported by the coupler.

10. The axle assembly of claim 5 further comprising a controller coupled with the coupler and configured to facilitate selective transmission of the activation signal to the coupler.

11. An axle assembly comprising:
    an axle;
    a differential coupled with the axle and configured to facilitate operation of the axle at an axle speed;

a differential lock assembly associated with the differential and movable between a locked position and an unlocked position;

a selector movable between a lock-initiate position and an unlock-initiate position; and a coupler comprising rheological fluid and an input, the coupler being configured to selectively couple each of the differential lock assembly and the selector, and the input being configured to receive an activation signal;

wherein:

the coupler is configured for operation in a deactivated mode and an activated mode in response to the activation signal;

when the coupler is in the deactivated mode, the differential lock assembly and the selector are decoupled from each other; and when the coupler is in the activated mode, the differential lock assembly and the selector are coupled together such that movement of the selector to the lock-initiate position facilitates movement of the differential lock assembly into the locked position.

12. The axle assembly of claim 11 wherein the coupler is configured for operation in the activated mode when the activation signal is received at the input, the activation signal being received at the input when a vehicular condition is below a threshold value.

13. The axle assembly of claim 12 wherein the vehicular condition comprises axle speed.

14. The axle assembly of claim 12 being configured such that, if the selector is in the lock-initiate position when the vehicular condition increases above the threshold value, the activation signal is disabled and the differential lock assembly automatically moves from the locked position to the unlocked position.

15. The axle assembly of claim 13 wherein the rheological fluid comprises electro-rheological fluid and the activation signal comprises an electrical field.

16. The axle assembly of claim 13 wherein the rheological fluid comprises magnetorheological fluid, the coupler comprises an electromagnetic coil, and the activation signal imparts a magnetic field upon the magnetorheological fluid.

17. An axle assembly comprising:

an axle;

a differential coupled with the axle and configured to facilitate operation of the axle at an axle speed;

a differential lock assembly movable between a locked position and an unlocked position, the differential lock assembly comprising:

a first member;

a lock fork attached to the first member; and a lock collar pivotally coupled with the lock fork and associated with the differential;

a selector comprising a second member and movable between a lock-initiate position and an unlock-initiate position;

a coupler comprising rheological fluid and an input, the coupler being configured to movably support the first member and the second member; and a controller coupled with the input of the coupler and configured to facilitate communication of an activation signal to the input when a vehicular condition is below a threshold value;

wherein, in response to the activation signal from the controller, the rheological fluid is configured to couple the first member and the second member together such that movement of the selector to the lock-initiate position facilitates movement of the differential lock assembly into the locked position.

18. A vehicle comprising:

a frame assembly;

an axle rotatably supported with respect to the frame assembly;

a differential coupled with the axle and configured to facilitate operation of the axle at an axle speed;

a differential lock assembly associated with the differential and movable between a locked position and an unlocked position;

a selector movable between a lock-initiate position and an unlock-initiate position; and a coupler configured to rotatably support each of the differential lock assembly and the selector, the coupler being configured for operation in a deactivated mode and an activated mode;

wherein, when the coupler is in the deactivated mode, the differential lock assembly and the selector are configured to rotate with respect to each other, and when the coupler is in the activated mode, the differential lock assembly and the selector are coupled together such that movement of the selector to the lock-initiate position facilitates movement of the differential lock assembly into the locked position.

19. The vehicle of claim 18 wherein the coupler is configured to operate in the activated mode when a vehicular condition is below a threshold value.

20. The vehicle of claim 19 wherein the vehicular condition comprises axle speed.

\* \* \* \* \*

UNITED STATES PATENT AND TRADEMARK OFFICE
CERTIFICATE OF CORRECTION

| | |
|---|---|
| PATENT NO. | : 8,292,774 B2 |
| APPLICATION NO. | : 12/616171 |
| DATED | : October 23, 2012 |
| INVENTOR(S) | : Ian Neal Haggerty |

Page 1 of 1

It is certified that error appears in the above-identified patent and that said Letters Patent is hereby corrected as shown below:

Column 2, line 54, change "Coupler" to --coupler--;
Column 3, line 64, change "tight" to --right--;
Column 6, line 8, change "prevented," to --prevented--;
Column 6, line 41, change "facilitate," to --facilitate--;
Column 7, line 47, change "Coupler" to --coupler--;
Column 8, lines 19-20, change "magnetorheological" to --the magnetorheological--; and
Column 8, line 44, change "activate," to --activate--.

Signed and Sealed this
First Day of January, 2013

David J. Kappos
*Director of the United States Patent and Trademark Office*